(No Model.)  2 Sheets—Sheet 1.

W. APPLEGARTH.
ROAD ENGINE.

No. 352,385.  Patented Nov. 9, 1886.

Witnesses,
Geo. H. Strong.
J. H. Rouse

Inventor,
Wm Applegarth
By Dewey & Co.
Attys (No Model.)  W. APPLEGARTH.  2 Sheets—Sheet 2.
ROAD ENGINE.

No. 352,385. Patented Nov. 9, 1886.

Witnesses,
Geo. H. Strong.
J. H. Towne

Inventor,
Wm Applegarth.
By Dewey & Co.
Attys

UNITED STATES PATENT OFFICE.

WILLIAM APPLEGARTH, OF FRESNO, CALIFORNIA.

ROAD-ENGINE.

SPECIFICATION forming part of Letters Patent No. 352,385, dated November 9, 1886.

Application filed August 25, 1886. Serial No. 211,859. (No model.)

*To all whom it may concern:*

Be it known that I, WILLIAM APPLEGARTH, of Fresno, Fresno county, State of California, have invented an Improvement in Road-Wagons; and I hereby declare the following to be a full, clear, and exact description of the same.

My invention relates to that class of traveling wagons which carry an engine for supplying the motive power, and which are known as "road-wagons."

My invention consists in the construction and combination of devices which I shall hereinafter fully explain.

The object of my invention is to provide a simple wagon of this class adapted to have great tractile power.

Figure 1:
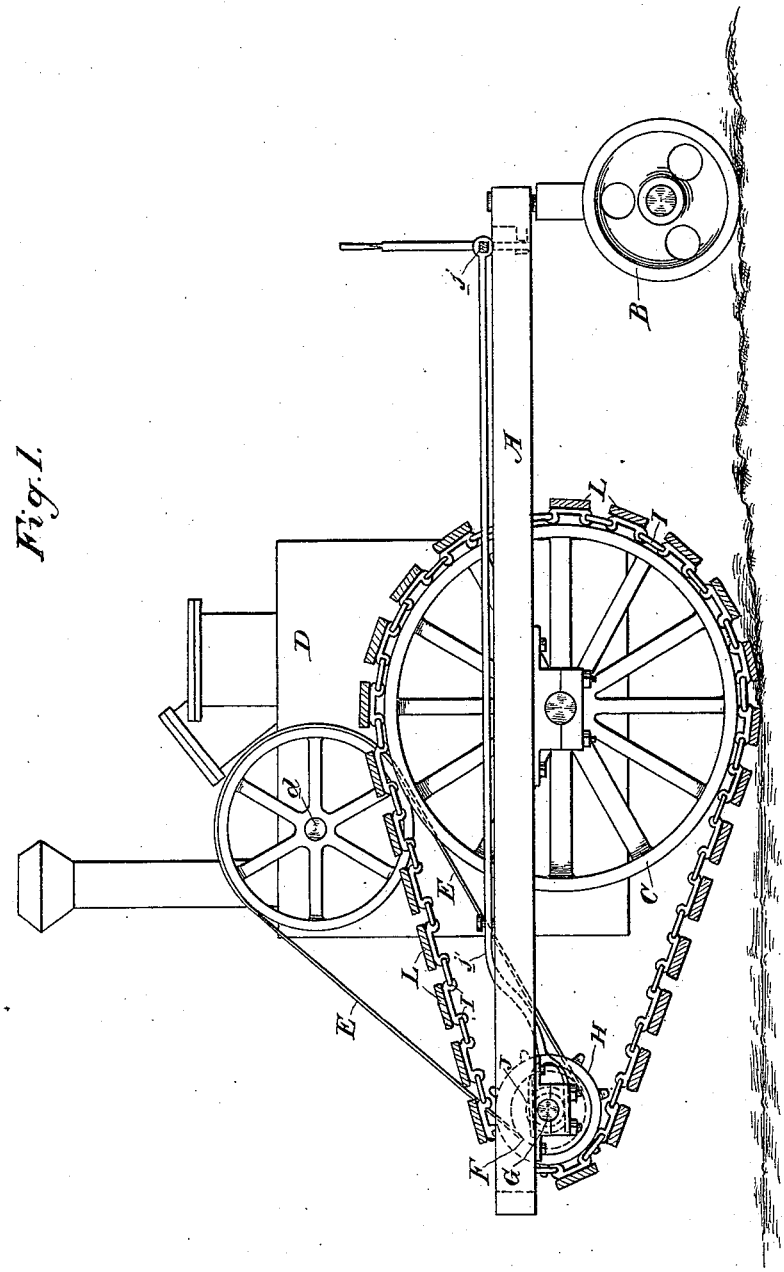
Figure 2:
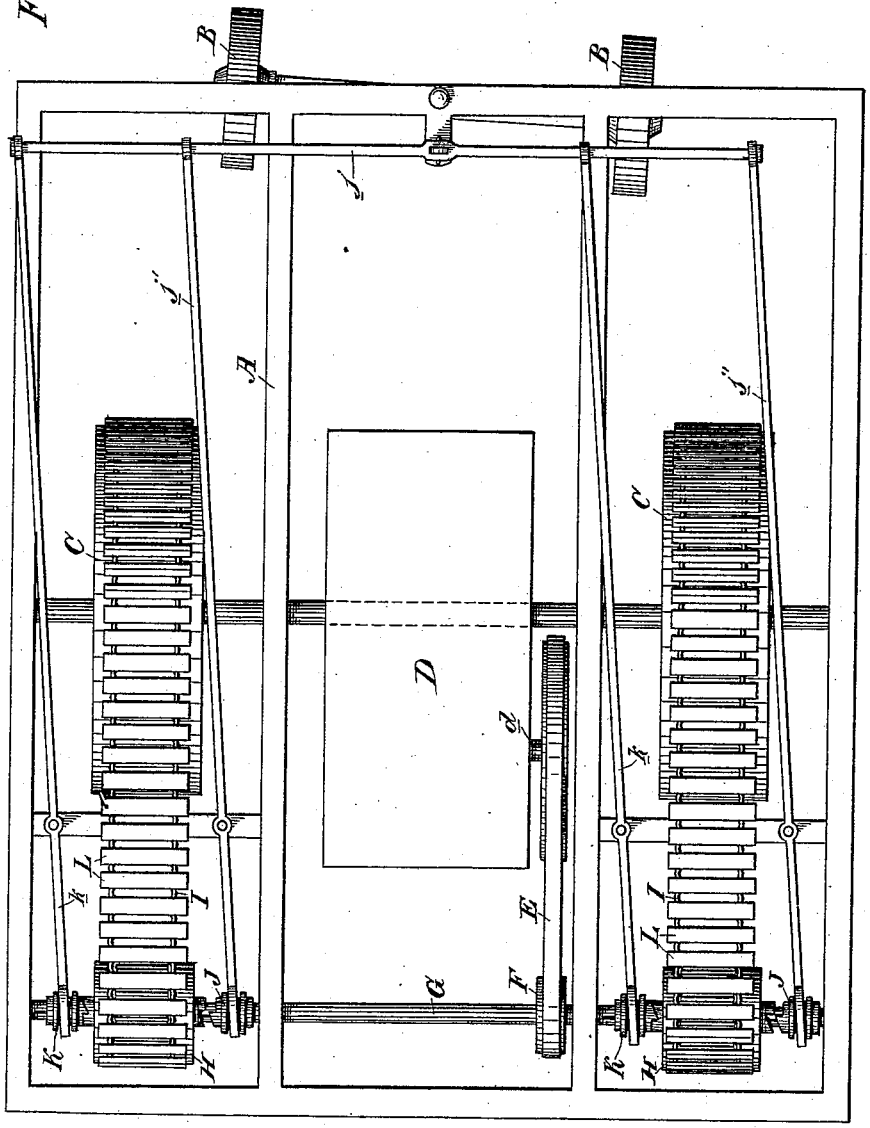

Referring to the accompanying drawings for a more complete explanation of my invention, Figure 1 is a side elevation of my road-wagon. Fig. 2 is a plan of same.

A is the main frame of the wagon, having small steering-wheels B at its front end and the wide-faced wheels C at its rear end.

Upon the wagon is located the engine D, of any suitable character, and placed in such position that its weight is carried by and between the main wheels C. The engine has a shaft, $d$, from which a belt, E, extends to a pulley, F, on a shaft, G, mounted transversely on the frame of the wagon back of the wheels C. Upon the ends of this shaft are chain-pulleys H, from which endless chains I extend to and around the peripheries of the wheels C. These wheels have a perfectly plain surface, and the chains simply pass around them, not, however, being otherwise connected. The chains in this position, by reason of being bound between the ground and the wheels, effect the rotation of the latter and the consequent progression of the wagon. The revolution of the endless chains thus imparts motion directly to the wheels of the wagon, while in other cases the motion is transmitted through suitable devices to the axle of the wagon, and thus indirectly to the wheels.

The chains I may be of any suitable form, and may in fact be belts, if such be desirable, though I prefer chains on account of their greater durability.

Provision may be made for reducing the speed of the engine by well-known means, so that when the power reaches the main wheels C it will be reduced sufficiently for the purpose. The object in placing the shaft G on the rear end of the wagon-frame is to relieve the steering-wheels of strain as much as possible.

In order to make a turn, the chain-pulleys H upon the shaft G are both loose, and are connected with the shaft by means of the feathered clutches J, which are operated by a sliding bar, $j$, and pivoted levers $j'$, connected therewith.

In order to move the wagon back by reversing the engine, I provide feathered clutches K for engaging the opposite sides of the chain-pulleys H, and these clutches are made the reverse of the opposing clutches J, as shown in Fig. 2. They are operated by means of the sliding bar $j$ and pivoted levers $k$, connected therewith. This arrangement of levers for the clutches, it will be observed, provides for the engagement of one and the simultaneous disengagement of the opposing one, so that the clutches may be readily operated to go forward or to back, and in either case to turn.

In order to obtain a wide tractile surface, the chains I may be provided with shoes L of greater or less width, which form practically portable tracks for the wagon to travel upon.

Having thus described my invention, what I claim as new, and desire to secure by Letters Patent, is—

1. In a road-wagon, the wheeled frame A, the engine thereon, and the shaft G, with its chain-pulleys H, forming part of the power-transmitting mechanism from the engine to the driving-wheels, in combination with the feathered clutches J, engaging one side of said pulleys, and the feathered clutches K, engaging reversely the other side, substantially as herein described.

2. In a road-wagon, the frame A, having the main supporting or carrying wheels C, and the engine D, in combination with the shaft G, driven from the engine, the loose chain-pulleys H on the shaft, the endless chains I, passing from said pulleys to and around the peripheries of the wheels C, the feathered clutches J, engaging one side of the loose pulleys, the feathered clutches K, engaging reversely the other side of said pulleys, and mechanism for simultaneously throwing one set of clutches into and the other out of engagement, substantially as herein described.

3. In a road-wagon, the frame A, having the main supporting or carrying wheels C, the engine D on the frame, the shaft G, the loose chain-pulleys H on the shaft, the endless chains I from said pulleys around the peripheries of the wheels C of the frame, and mechanism for driving the shaft from the engine, in combination with the feathered clutches J, engaging one side of the loose pulleys H, the feathered clutches K, engaging reversely the other side of said pulleys, the pivoted levers $j'$, secured to the clutches J, the pivoted levers $k$, secured to the clutches K, and the sliding bar $j$, with which said levers are connected, substantially as and for the purpose herein described.

4. In a road-wagon, the frame A, having main supporting and carrying wheels C, and an engine, D, in combination with the endless chains I, driven by the engine and passing around the peripheries of the wheels C, and the shoes L on the chains, substantially as herein described.

In witness whereof I have hereunto set my hand.

WILLIAM APPLEGARTH.

Witnesses:
S. H. NOURSE,
H. C. LEE.